Patented Jan. 2, 1923.

1,440,813

UNITED STATES PATENT OFFICE.

REZSÖ BENKÖ, OF BUDAPEST, HUNGARY.

IODINE COMPOUND AND METHOD OF MAKING SAME.

No Drawing.   Application filed April 29, 1921.   Serial No. 465,474.

*To all whom it may concern:*

Be it known that I, REZSÖ BENKÖ, chemist, a citizen of Hungary, residing at Budapest, in Hungary, have invented certain new and useful Improvements in Iodine Compounds and Methods of Making Same, of which the following is a specification.

My invention relates to iodine compounds and more especially to a compound of this kind which is less poisonous than iodine and will, on being introduced into the body by injection, deposit almost its total content of iodine.

I obtain a compound of the kind aforesaid by heating a solution of an albuminoid or a neutralized product of decomposition of an albuminoid, such as gelatose, with hexamethylene-tetramine-diiodid, filtering the solution and evaporating to dryness in vacuo. Preferably the hexamethylene-tetramine-diiodide is not added as such to the solution of the albuminoid, but is caused to be formed in this solution from hexamethylene-tetramine and the predetermined quantity of iodine.

In carrying my invention into practice I prefer proceeding for instance as follows: 12 grams hexamethylene-tetramine are dissolved in 1000 grams of a 5 per cent gelatine solution. To the solution thus obtained there is added a solution of 22.5 grams iodine in 225 grams of alcohol. The turbid yellow liquid is heated on the water bath until the colour which during the first stage of heating has considerably darkened, brightens again, a practically limpid, slightly yellowish liquid being obtained which may either be used directly after filtering or else be evaporated to dryness in vacuo. The product contains about 20 per cent iodine in combined condition, but no free iodine nor hexamethylene-tetramine-diiodide.

It may sometimes prove advantageous to use an excess of hexamethylene-tetramine. Instead of an alcoholic solution of iodine, I may as well employ a solution of iodine-potassium iodide, hexamethylene-tetramine-tetraiodide being formed as an intermediate product. The potassium iodide and the hexamethylene-tetramine in excess may be removed from the final solution by dialysis.

The novel compound thus obtained and which I presume to be gelatine-hexamethylene-tetramine-diiodide is readily soluble with slightly yellow colour in water and glycerine and forms with nitrate of silver a yellow deposit. On hydrogen peroxide, free of acid, being added to the solution, hexamethylene-tetramine-diiodide separates out and can be extracted with chloroform, the yellow colour of this extract proving the absence of iodine. Acids will precipitate iodine; by simultaneously adding acid and oxidizing agents the iodine is separated out quantitatively.

The chemical properties of the novel compounds allow to distribute iodine in the organism in a very advantageous manner; on the other hand their low poisonousness, as compared with iodine proper, permits to introduce great doses into the body without any injurious effect.

The novel compounds behave in the organism in a very peculiar manner: the iodine contained therein is segregated from the healthy human body far more slowly than the iodine contained in potassium iodide or in other organic iodine compounds. However this segregation is further retarded by tissues attacked by some illness such as by luetic and to a higher degree still by tuberculous cells.

I claim:

1. As a new product, a compound assumed to be gelatine-hexamethylene-tetramine-diiodide, said compound being readily soluble in water and glycerine with slightly yellow colour, forming with nitrate of silver a yellow precipitate, with hydrogen peroxide hexamethylene-tetramine-diiodide, with acids free iodine.

2. As a new product, the compound formed by heating the solution of an albuminoidous substance with hexamethylene-tetramine-diiodide.

3. The method which consists in heating a solution containing an albuminoidous substance with hexamethylene-tetramine-diiodide and evaporating to dryness in vacuo.

4. The method which consists in adding to a solution of gelatine and hexamethylene-tetramine the quantity of iodine required for the formation of a diiodide, heating until the solution gets limpid and evaporating to dryness in vacuo.

In testimony whereof I affix my signature in presence of two witnesses.

REZSÖ BENKÖ.

Witnesses:
  CHARLES MEDGYES,
  EUGENE HARNUYS.